United States Patent Office 3,654,187

Patented Apr. 4, 1972

3,654,187

CONDUCTIVE FILM FOR ELECTRIC HEATER

Haruo Takenaka, Nobuo Hiratsuka, and Toshiaki Okiyama, Kanagawa, Japan, assignors to Fuji Photo Film Co., Ltd., Kanagawa, Japan No Drawing. Filed Jan. 30, 1969, Ser. No. 795,343
Claims priority, application Japan, Jan. 30, 1968, 43/5,561
Int. Cl. B01f *5/00;* H01b *1/06*
U.S. Cl. 252—511 8 Claims

ABSTRACT OF THE DISCLOSURE

A conductive film for electric heaters containing a plastic film having a thermal softening point of higher than 100° C. and having uniformly dispersed therein 5–50% by weight based on the plastic film of a conductive material, the thickness of the fim being less than 400 microns and the intrinsic volume resistance being less than $10^6\Omega$/cm.

BACKGROUND OF THE INVENTION (1) Field of the invention

This invention relates to a conductive film for electric heaters and more particularly, it is concerned with a conductive film for electric heater film in which an electrically conductive material is uniformly dispersed in a plastic film having a thermal softening point of higher than 100° C.

(2) Description of the prior art

Generally, a Nichrome wire is used as an electric heating material, but the use of such material is accompanied by disadvantages such as uneven warming when plane heating, accidental breaking of the wire, and lack of ease of fabrication.

DESCRIPTION OF THE INVENTION

It is the principal object of the invention to provide a conductive film for electric heaters capable of generating heat uniformly, being readily worked or handled, and having high resistivity and durability.

The foregoing object can be accomplished by the use of an electric heater film having a thickness of less than 400 microns and volume resistance of less than $10^6\Omega$/cm., in which, in a plastic having a thermal softening temperature of higher than 100° C., is uniformly dispersed 5–50% by weight an electrically conductive material.

Since the electric heating material of the invention is of a plane film shape, it heats uniformly throughout its surface and thus warms an object uniformly with a high resistivity, and a small temperature coefficient. Furthermore, the secondary working and handling are convenient. On the contary, Nichrome wire, the commonly used electric heating material, is not fit for working into a plane heater by arranging the Nichrome wire in a plane. In addition, the electric heating material of the invention is freed from the problem of accidental breaking of the wire and sufficiently durable because of its film shape, unlike the known Nichrome wire.

The electric heater film of the invention has found wide uses for heat retaining and room conditioning in the industrial field. Some examples are, various electric heaters, electric foot warmers, electric slippers, electric bedclothes, heat retainers and heat sources in trouser pressers and building structures.

The plastics used in the invention are preferably soluble in organic solvents, and preferably have a heat resistance such as thermal softening temperature of more than 100° C. Illustrative of such plastics are: cellulose ester resins, such as cellulose triacetate, cellulose diacetate and cellulose acetate butyrate; polycarbonate resins; polyphenylene oxide resins; polyimide resins; polyamide resins; polyimide-amide resins; polyvinyl alcohol resins and ABS resins. Plastics having thermal softening temperatures of lower than 100° C. are not fit therefor because they soften thermally during the heat generation.

Other plastics are not preferable in respect to solubility and heat resistance. For example, polyethylene terephthalate resins, polypropylene resins, polyethylene resins, and fluorine resins are inferior in solubility and polyvinyl chloride resins, polyvinyl acetate resins and polystyrene resins are inferior in heat resistance since their thermal softening temperatures are less than 100° C. As the electrically conductive material to be dispersed in plastics are used; carbon black, graphite silver powder, tin chloride, tin oxide, antimony, etc. The content of the electrically conductive material is preferably within a range of 5–50% by weight of the foregoing plastics, since when more than 50% by weight, the film is too fragile to resist use and when less than 5% by weight, the resistivity is so large that no electric current occurs, and heat generation is too small.

As the electrically conductive material, it is preferred to use a high electric conductivity carbon black. Illustrative of the high electric conductivity carbon black are conductive furnace black, superconductive furnace black and extraconductive furnace black (for example, Asahi XC–550, HS–500 manufactured by Asahi Carbon Co., Ltd.) and acetylene black (for example, Denka Acetylene Black manufactured by Denki Kagakukogyo K. K.).

The characteristics of an electric heater can be made remarkably excellent by forming said electric heater into a plastic film shape according to the invention. That is to say, the heating speed after applying a voltage is much higher than that of a non-film-shaped plastic heater, and the surface heating is much more uniform than that of a non-film-shaped plastic heater. A non-film-shaped plastic heater tends to deteriorate due to cracking fragility, but a film-shaped heater of less than 400 microns thickness is freed of such deterioration. The durability is very excellent. Furthermore, when the surface is of a smooth film shape and, thus, it is easy to apply an electrode material thereto, for example dispersion of silver powder in a plastic to make an electrode. The resulting electrode is very excellent in the evenness of electric current, durability, and ease of connection of terminals.

The electric heater film of this invention is generally produced by dissolving the foregoing plastic in one or more solvents. The solvents include, alcohols, such as methanol and ethanol; esters, such as mehyl acetate and ethyl acetate; ketones, such as acetone and methyl ketone; chlorinated hydrocarbons, such as methylene chloride and ethylene chloride; hydrocarbons, such as benzene and toluene; amides, such as dimethylformamide and dimethylacetamide; and water, if necessary. The following may then be added to the solution (1) a plasticizer such as triphenyl phosphate, dioctyl phthalate or diethyl phthalate and (2) a deterioration inhibitor such as phenyl-alpha-naphthyl-amine or N,N′ - diphenyl-p-phenylenediamine. The foregoing electrically conductive material is then uniformly dispersed therein by means of a homomixer, ball mill or mixer and then the resulting dispersion is spread over a revolving drum or a flat moving steel strip. The film must have a high precision of thickness for the purpose of uniform surface heating. To this end, a solution film making method is particularly preferred wherein a solution is flowed or spread over a flat moving support. The weight of the electrically conductive material is preferably within a range of 5–50% by weight based on the plastic.

The thickness of the electric heater film may be optionally chosen, but, in general, is preferably less than 400 microns, and the intrinsic volume resistance is preferably less than $10^6 \Omega$/cm. When the thickness is more than 400 microns, cracks occur during electric heating so that the electric heater film is of no use, and when the intrinsic volume resistance is more than $10^6 \Omega$/cm., a predetermined electric current is not obtained.

The so obtained electric heater film has advantages in that there is more uniform heat by a smaller wattage than in the case of Nichrome wire, the resistivity is high with a small temperature coefficient, the durability is excellent, and the secondary working and handling characteristics are good.

The following examples, in which all references to proportions are to be taken as references to proportions by weight, are given in order to illustrate the invention in detail.

EXAMPLE 1

150 parts of cellulose triacetate resin (degree of acetylation; 60.8%) was dissolved in 1800 parts of methylene chloride and 200 parts of methanol, the solution was mixed with 22 parts of triphenyl phosphate and further with 30 parts of carbon black. The mixture was kneaded for 72 hours in a ball mill and filtered.

The resulting solution was casted on a flat moving surface in a dry thickness of 120 microns to provide an electric heater film of a flat surface and uniform thickness.

The resulting electric heater film had an intrinsic volume resistance of $1.4 \times 10^4 \Omega$/cm. and produced heat uniformly. The surface treatment was 80° C. when an electric current of 100 volts and 0.2 ampere was passed between electrodes placed on the short sides of the 10 cm. x 20 cm. film for 5 minutes.

EXAMPLE 2

100 parts of polycarbonate resin was dissolved in 800 parts of methylene chloride and 100 parts of methanol. The solution was mixed with 10 parts of carbon black and 10 parts of graphite as an electrically conductive material, and the mixture was kneaded for 70 hours in a ball mill and filtered.

The resulting solution was casted on a flat moving surface in a thickness of 100 microns to provide an electric heater film of a flat surface and uniform thickness.

The resulting electric heater film had an intrinsic volume resistance of $8.2 \times 10^4 \Omega$/cm. and produced heat uniformly. The surface temperature thereof being 92° C. when an electric current of 100 volts and 0.28 ampere was passed between electrodes placed on the short sides of a 10 cm. x 20 cm. piece of the film for 5 minutes.

EXAMPLE 3

100 parts of polyphenylene oxide resin was dissolved in 900 parts of methylene chloride. The solution was mixed with 25 parts of tin oxide and 10 parts of antimony, and the mixture was kneaded for 75 hours in a ball mill and filtered.

The solution was casted on a flat moving surface in a dry thickness of 80 microns to provide an electric heater film of a flat surface and uniform thickness.

The thus resulting electric heater film had an intrinsic resistance of $2.1 \times 10^3 \Omega$/cm. and produced heat uniformly. The surface temperature thereof being 105° C. when an electric current of 100 volts and 0.48 ampere was passed between electrodes on the short sides of a 10 cm. x 20 cm. piece of the film for 5 minutes.

We claim:

1. A conductive film for electric heaters consisting essentially of a plastic film having a thermal softening point of higher than 100° C., said plastic being selected from the group consisting of a cellulose triacetate resin, a polycarbonate resin and a polyphenylene oxide resin, and a plasticizer, having uniformly dispersed therein 5–50% by weight based on the plastic film of a conductive material, the thickness of said film being less than 400 microns and the intrinsic volume resistance being less than $10^6 \Omega$/cm.

2. The conductive film for electric heaters as claimed in claim 1, wherein said electrically conductive material is selected from the class consisting of carbon black, graphite silver powder, tin chloride, tin oxide and antimony.

3. The conductive film for electric heaters as claimed in claim 1 wherein the plasticizer is selected from the group consisting of triphenyl phosphate, dioctyl phthalate and diethyl phthalate.

4. The conductive film for electric heaters as claimed in claim 1 wherein a deterioration inhibitor is also present.

5. The conductive film for electric heaters as claimed in claim 4 wherein the inhibitor is selected from the group consisting of phenyl-α-naphthylanine and N,N'-diphenyl-p-phenylenediamine.

6. The conductive film as in claim 1 wherein said plastic film consists essentially of a cellulose triacetate resin dissolved in a mixture of methylene chloride and methanol.

7. The conductive film of claic 1 wherein said plastic film consists esentially of a polycarbonate resin dissolved in a mixture of methylene chloride and methanol.

8. The conductive film of claim 1 wherein said plastic film consists essentially of a polyphenylene oxide resin dissolved in methylene chloride.

References Cited

UNITED STATES PATENTS

| | | | |
|---|---|---|---|
| 3,507,951 | 4/1970 | Morecroft et al. | 260—37 PC |
| 2,282,832 | 5/1942 | Spooner | 252—510 |
| 2,386,095 | 10/1945 | Edgar et al. | 252—511 |
| 3,173,885 | 3/1965 | Short | 252—511 |
| 3,301,707 | 1/1967 | Loeb et al. | 252—511 |
| 3,439,306 | 4/1969 | Schimmel | 252—511 |
| 3,444,183 | 5/1969 | Hubbuch | 252—511 |

DOUGLAS J. DRUMMOND, Primary Examiner

U.S. Cl. X.R.

260—37 PC; 252—514, 518